United States Patent
Chow et al.

(10) Patent No.: US 9,887,842 B2
(45) Date of Patent: Feb. 6, 2018

(54) BINDING SOFTWARE APPLICATION BUNDLES TO A PHYSICAL EXECUTION MEDIUM

(71) Applicant: International Business Machines Corporation, Armonk, NY (US)

(72) Inventors: Stephen Chow, Plano, TX (US); Grant D. Miller, Arvada, CO (US); Nader M. Nassar, Yorktown Heights, NY (US); Richard J. Newhook, Egg Harbor City, NJ (US); Erich D. Walls, Valparaiso, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/755,315

(22) Filed: Jun. 30, 2015

(65) Prior Publication Data
US 2017/0005798 A1  Jan. 5, 2017

(51) Int. Cl.
| H04L 9/32 | (2006.01) |
| H04L 9/14 | (2006.01) |
| H04L 29/08 | (2006.01) |
| H04W 4/00 | (2009.01) |
| H04L 9/06 | (2006.01) |
| H04L 9/30 | (2006.01) |

(52) U.S. Cl.
CPC ............... *H04L 9/14* (2013.01); *H04L 67/06* (2013.01); *H04W 4/003* (2013.01); *H04L 9/06* (2013.01); *H04L 9/30* (2013.01)

(58) Field of Classification Search
CPC ... H04L 63/08; G06F 2221/2107; G06F 21/10

USPC .................................................. 713/165, 168
See application file for complete search history.

(56) References Cited

U.S. PATENT DOCUMENTS 8,060,874 B2  11/2011  Rengarajan
8,539,445 B2   9/2013  Gangemi et al.
(Continued)

FOREIGN PATENT DOCUMENTS

| CN | 101043680 A | 9/2007 |
| EP | 1703382 A1 | 9/2006 |
| WO | 2004092886 A2 | 10/2004 |

OTHER PUBLICATIONS

Mell et al., "The NIST Definition of Cloud Computing," National Institute of Standards and Technology, Sep. 2011, p. 1-3, Special Publication 800-145.

*Primary Examiner* — Anthony Brown
(74) *Attorney, Agent, or Firm* — Michael O'Keefe

(57) ABSTRACT

According to one embodiment, a method for binding an application bundle. The method includes receiving a download request for an application bundle. The method also includes retrieving the application bundle from a master data store within an application store. The method further includes encrypting the retrieved application bundle based on a device specific encryption key associated with a device. The method also includes transmitting the encrypted application bundle to the device. The method further includes receiving an execution request for the transmitted application bundle. The method also includes decrypting the transmitted application bundle based on a device specific decryption key associated with the device. The method further includes sending the decrypted application bundle to an execution interface.

17 Claims, 7 Drawing Sheets

(56) References Cited

U.S. PATENT DOCUMENTS

| | | |
|---|---|---|
| 9,129,098 B2 | 9/2015 | Indenbom |
| 2006/0137022 A1 | 6/2006 | Kilian-Kehr |
| 2008/0256368 A1 | 10/2008 | Ross et al. |
| 2011/0296175 A1 | 12/2011 | Shin |
| 2012/0109902 A1* | 5/2012 | Rozensztejn ..... G06F 17/30902 707/689 |
| 2013/0019105 A1 | 1/2013 | Hussain |
| 2013/0232542 A1* | 9/2013 | Cheng ................ G06F 21/6218 726/1 |
| 2014/0359306 A1* | 12/2014 | Sasao ..................... G06F 21/52 713/189 |
| 2016/0134660 A1 | 5/2016 | Ponsini |

* cited by examiner

BINDING SOFTWARE APPLICATION BUNDLES TO A PHYSICAL EXECUTION MEDIUM

FIELD OF INVENTION

The present invention relates generally to the field of computing, and more particularly to software applications.

BACKGROUND

A mobile device ecosystem may be a collection of devices, software, and companies. The mobile device ecosystem may also include transferring or sharing data between one or more devices or within the same device between programs. Users of smart devices, such as smartphones, within a mobile device ecosystem may be able to download and install application bundles, or apps, from designated services, such as the Apple® App Store (Apple and all Apple-based trademarks and logos are trademarks or registered trademarks of Apple, Inc. and/or its affiliates) and Google® Play Store (Google and all Google-based trademarks and logos are trademarks or registered trademarks of Google, Inc. and/or its affiliates), for use on a smart device.

SUMMARY

According to one embodiment, a method for binding an application bundle. The method includes receiving a download request for an application bundle. The method also includes retrieving the application bundle from a master data store within an application store. The method further includes encrypting the retrieved application bundle based on a device specific encryption key associated with a device. The method also includes transmitting the encrypted application bundle to the device. The method further includes receiving an execution request for the transmitted application bundle. The method also includes decrypting the transmitted application bundle based on a device specific decryption key associated with the device. The method further includes sending the decrypted application bundle to an execution interface.

According to another embodiment, a computer system for binding an application bundle. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving a download request for an application bundle. The computer system also includes retrieving the application bundle from a master data store within an application store. The computer system further includes encrypting the retrieved application bundle based on a device specific encryption key associated with a device. The computer system also includes transmitting the encrypted application bundle to the device. The computer system further includes receiving an execution request for the transmitted application bundle. The computer system also includes decrypting the transmitted application bundle based on a device specific decryption key associated with the device. The computer system further includes sending the decrypted application bundle to an execution interface.

According to yet another embodiment, a computer program product for binding an application bundle. The computer program product may include one or more computer-readable storage devices and program instructions stored on at least one of the one or me tangible storage devices, the program instructions executable by a processor. The computer program product may include program instructions to receive a download request for an application bundle. The computer program product may also include program instructions to retrieve the application bundle from a master data store within an application store. The computer program product may further include program instructions to encrypt the retrieved application bundle based on a device specific encryption key associated with a device. The method also includes transmitting the encrypted application bundle to the device. The computer program product may further include program instructions to receive an execution request for the transmitted application bundle. The computer program product may also include program instructions to decrypt the transmitted application bundle based on a device specific decryption key associated with the device. The computer program product may further include program instructions to send the decrypted application bundle to an execution interface.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
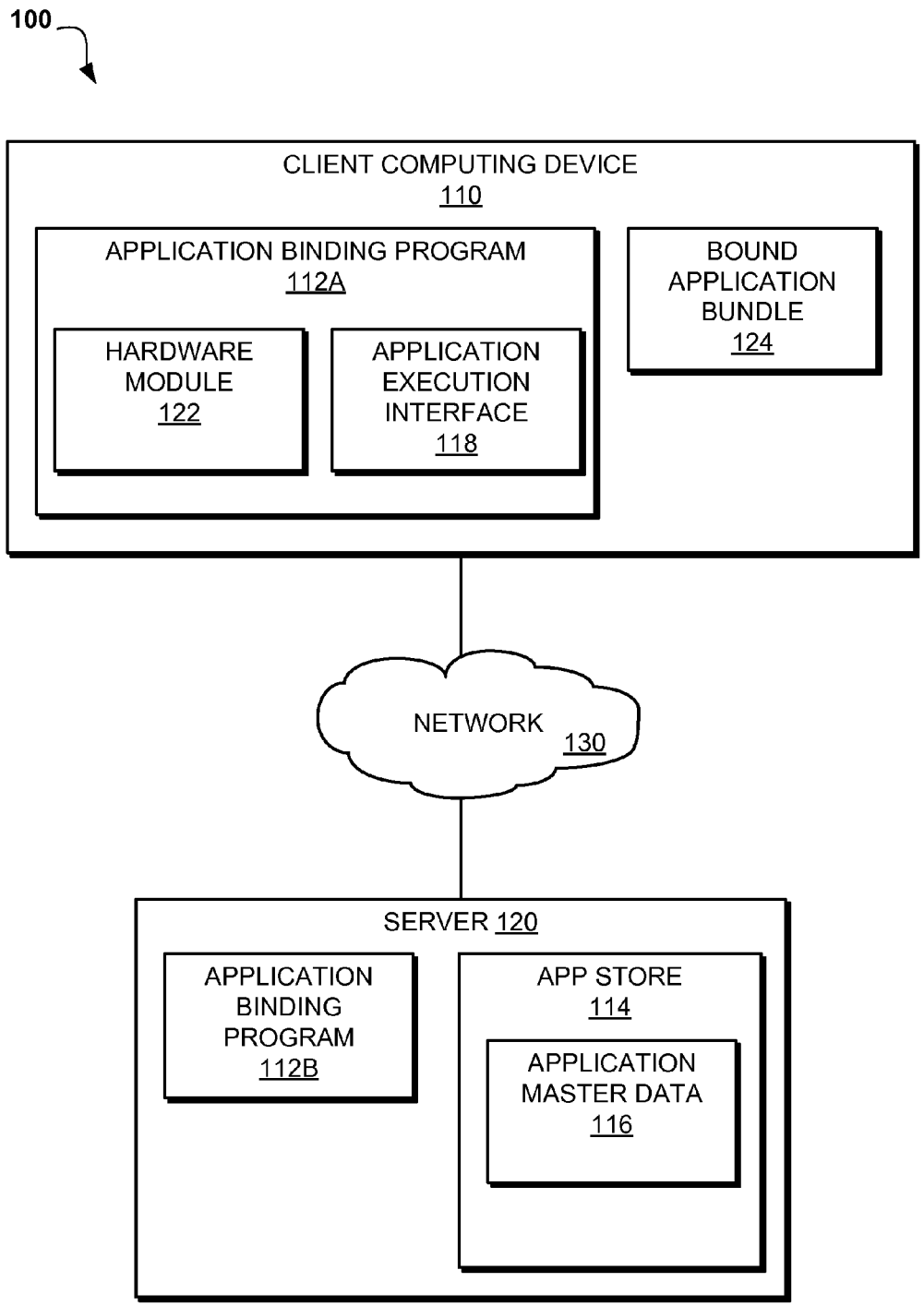
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to software applications. The following described exemplary embodiments provide a system, method, and program product to, among other things, bind software application bundles, such as executable code and embedded data, to a physical execution medium. Therefore, the present embodiment has the capacity to improve the technical field of software applications by binding the contents of an application bundle to the device on which it was originally downloaded and installed, therefore, making the application bundle unusable on other devices. More specifically, even if a device's internal software security is compromised and the application bundle is copied and transferred to another device, the copied application bundle may not be properly executed on the other device. Additionally, the copied application bundle may not otherwise be modified to subvert any internal software security components.

As previously described, a mobile device ecosystem may be a collection of devices, software, and companies as well as transferring and sharing data between multiple devices or within the same device between programs. Users of smart devices, such as smartphones, within a mobile device ecosystem may be able to download and install application bundles, or apps, from designated services, or app stores, such as the Apple® App Store and Google® Play Store. An app store may maintain a central repository of all application bundles available for download and installation within the app store distribution catalog.

Typically, an app store may present a list of available application bundles for download and may manage the purchase, licensing, and installation of application bundles onto a mobile device. The app store may also act as a copy protection system that tracks which application bundles a device may be permitted to download and install. If a user associated with the device does not have permission to download and install the application bundle, the app store may not permit the download and installation of the application bundle. For example, a user purchasing application bundle X may not then download application bundle Y that the user did not purchase.

After performing a licensing check, many app stores may encrypt an application bundle with a universal set of encryption keys that are not specific to the device downloading the application bundle. Decryption of the application bundle may be performed by any device containing the corresponding set of cryptographic keys. Therefore, such a security system may not full protect an application bundle from being removed from a jailbroken device and illegally copied to another device.

Furthermore, in order for an app store to operate under a copy protection model, a device may be required to establish a complete ecosystem of security surrounding the device. This setup may ensure a user is not able to inspect the contents of the application bundle directly. However, if a device has a permissive security system or the device security system has been overridden through a jailbreaking process, then the user may be able to inspect the application bundle and gain access to the application bundle contents. If the application bundle is accessible to a user, unauthorized reproduction, and distribution of the application bundle to other devices may be possible. As such, it may be advantageous, among other things, to implement a system that encrypts and binds an application bundle to a specific device, which may prevent unauthorized access and duplication of the application bundle.

According to one embodiment, since many devices contain a set of cryptographic certificates, encryption keys, or other such identifiers unique to the physical device, application bundle contents, such as executable code and embedded data, may be strongly bound to the download and installation device. Such binding to the original installation device may make the application bundle unusable on other devices. Rather than relying on an external protective system, such as an app store, the present invention may embed the protection and binding mechanisms directly in the application bundle so that the protection system remains with the application bundle even if the application bundle is copied and transferred to another device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to bind software application bundles to a physical execution medium. According to at least one implementation, the present embodiment may harness an "app store"-style of application distribution system in conjunction with a device's unique cryptographic information to generate an application bundle that, at the time of issuance or installation, is crafted to be executable only on a specific device. Upon an installation request, a device-specific encrypted binary version of the application bundle is created and sent to the requesting device. The requesting device may include a component to decrypt the device-specific application bundle upon each user requested execution. Therefore, if the application bundle is copied to a second device, the decryption/execution module would generate output that would not be executable on the second device.

Referring to FIG. 1, an exemplary networked computer environment 100 is depicted, in accordance with one embodiment. The networked computer environment 100 may include client computing device 110 and server 120 interconnected via communication network 130. According to at least one implementation, networked computer environment 100 may include a plurality of client computing devices 110 and servers 120, only one of which is shown for illustrative brevity.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may be, for example, a mobile device, a telephone, a personal digital assistant, a netbook, a laptop computer, a tablet computer, a desktop computer, or any type of computing device capable of running a program and accessing a network. Client computing device 110 may be capable of hosting application binding program 112A, bound application bundle 124 and communicating with server 120 via network 130, in accordance with one embodiment of the invention. As will be discussed with reference to FIG. 5, client computing device 110 may include internal components 502a and external components 504a, respectively.

Server computer 120 may be a laptop computer, netbook computer, personal computer (PC), a desktop computer, or any programmable electronic device capable of hosting application binding program 112B, app store 114, and communicating with client computing device 110 via network 130, in accordance with embodiments of the invention. As will be discussed with reference to FIG. 5, server computer 120 may include internal components 502b and external components 504b, respectively. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

According to the present embodiment, app store 114 may be a central, segregated application distribution and licensing infrastructure, such as the Apple® App Store and Google® Play Store. App store 114 may not be controlled or otherwise directly manipulated by end users. App store 114 may maintain a central repository of all application data, such as application master data 116, available for download and installation within the app store distribution catalog.

According to the present embodiment, application binding program 112A, 112B may be a program capable of binding an application bundle to a specific device, such as client computing device 110, permitted to download and install the application bundle. Application binding program 112B on server 120 may be capable of encrypting application data. Application binding program 112A on client computing device 110 may capable of decrypting application data in real time using hardware module 122 and application execution interface 118. Application binding program 112A, 112B is explained in further detail below with respect to FIG. 2.

According to the present embodiment, bound application bundle 124 may be a device-specific bound version of an application. Bound application bundle 124 may include encrypted files that may only be decrypted using a set of keys available on a specific device to which the application bundle is bound, such as client computing device 110. Bound application bundle 124 may include binary data files, imagery files, and other content files related to execution of the application associated with bound application bundle 124.

According to the present embodiment, hardware module 122 may be a hardware component physically build into an end user device, such as client computing device 110, which implements asynchronous cryptographic techniques. Hardware module 122 may include two binary-based codes, such as a private key and a public key. The public key may be a binary-based code readily available to all components connected to hardware module 122 via an interface, such as application execution interface 118, or via network 130. The public key may be used to encrypt data intended for a particular recipient. The private key may be a binary-based code embedded within hardware module 122 upon initial manufacture and may not be subsequently extracted by an interface, such as application execution interface 118. The private key may be used to decrypt data that may have been encrypted by a public key.

According to the present embodiment, application execution interface 118 may be a program capable of executing a bound application bundle 124. Furthermore, application execution interface 118 may identify encrypted portions of data necessary for the execution of bound application bundle 124 and, subsequently, send the identified encrypted portions of data to hardware module 122 for decryption.

Figure 2:
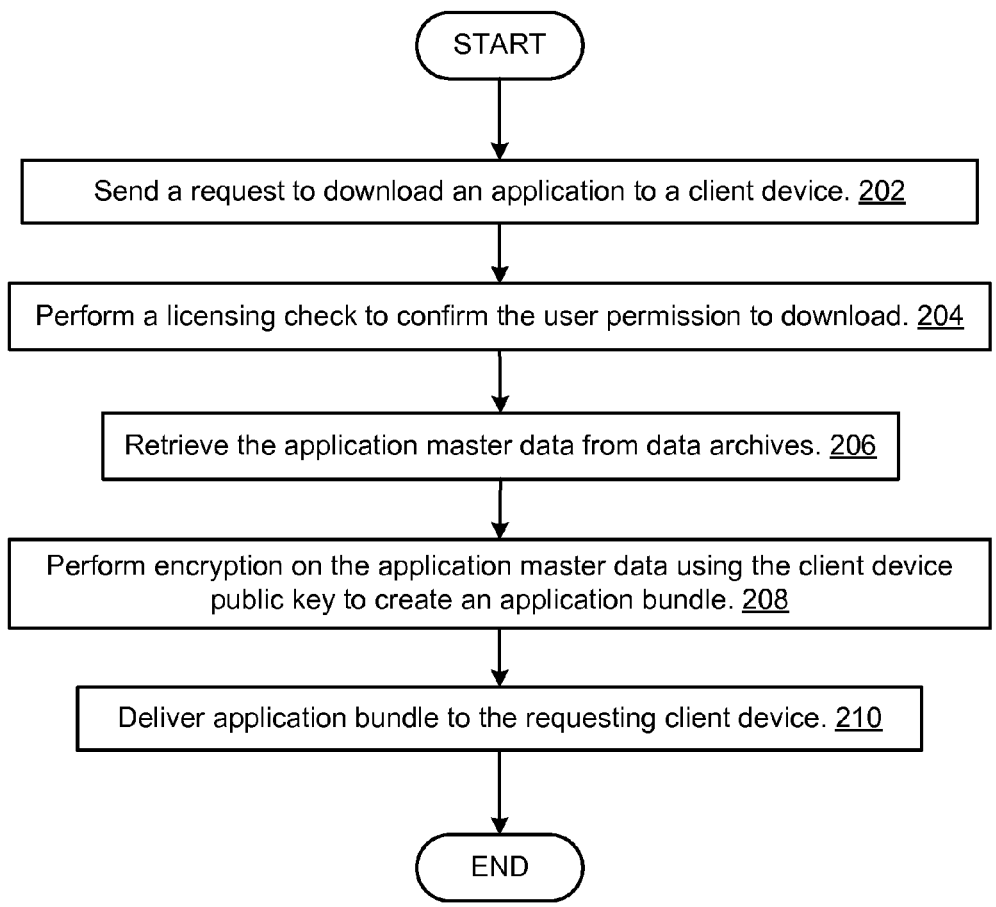
FIG. 2 illustrates a flowchart of the operational steps carried out by a program to bind a software application bundle to a specific device, in accordance with one embodiment of the present invention.

Referring now to FIG. 2, a flowchart 200 illustrating the operational steps carried out by a program to bind a software application bundle to a specific device, in accordance with one embodiment of the present invention. At 202, a download request is received by app store 114 connected to application binding program 112B to permit client device 110 to download an application bundle. For example, when a user purchases an application for a smartphone on app store 114, the user may then select to download the purchased application using a graphical user interface associated with app store 114.

Next at 204, app store 114 performs a licensing check to confirm the user is permitted to download the requested application. When a user purchases an application from app store 114, the user may be obtaining a license to download, install, and use the purchased application. Prior to processing each download request, app store 114 may verify the user requesting to download a specific application holds a valid license for the application. For example, when app store 114 receives a download request from a user to download a copy of an application, app store 114 may perform a licensing check to determine whether the account associated with the user contains a valid license for the application.

Then at 206, app store 114 retrieves the application master data 116 associated with the requested application from the app store data archives. Once app store 114 has determined the user requesting to download an app is holds a valid license to download and install the requested app, app store 114 may retrieve the application master data 116 from the app store data archives containing application data for all applications available on app store 114. Furthermore, app store 114 may create an application bundle by creating a copy of application master data 116. By creating the application bundle through copying application master data 116, app store 114 may enable application binding program 112B to encrypt the data prior to sending the application bundle to client computing device 110.

Next at 208, application binding program 112B encrypts the application bundle using the public key associated with client computing device 110. As previously described, a public key may be a cryptographic key used to encrypt data intended for a particular recipient, such as client computing device 110. In order for an application bundle to be bound to a particular device, such as client computing device 110, application binding program 112B may use the public key associated with the device to encrypt the application bundle obtained from app store 114. When data is encrypted with a public key, the data may only be decrypted using the private key corresponding to the public key. Furthermore, since the private key may be hardware-based and not copied or removed from the device to which it is associated, the encrypted data may only be decrypted by the device containing the private key. For example, if an application bundle is encrypted using the public key associated with client computing device 110, the application bundle may only be decrypted by the private key associated with and located on client computing device 110. Therefore, if an application bundle encrypted using a public key associated with client computing device 110 is installed and executed on a difference device, the application bundle may not be decrypted since the device may not contain private key associated with client computing device 110 needed to decrypt the application bundle.

Then at 210, app store 114 delivers the application bundle to the requesting client device. The application bundle received by the requesting device, such as client computing device 110, may be referred to as bound application bundle 124, since the encrypted data within bound application bundle 124 may only be decrypted by the receiving device. Once app store 114 delivers the application bundle to the requesting device, app store 114 may delete the data used to prepare the application bundle delivered to the requesting device. For example, if app store 114 sends only a copy of the application bundle to the requesting device, app store 114 may delete the original encrypted application bundle that may remain on server 120 since app store 114 may no longer have a need for the original encrypted application bundle.

Figure 3:
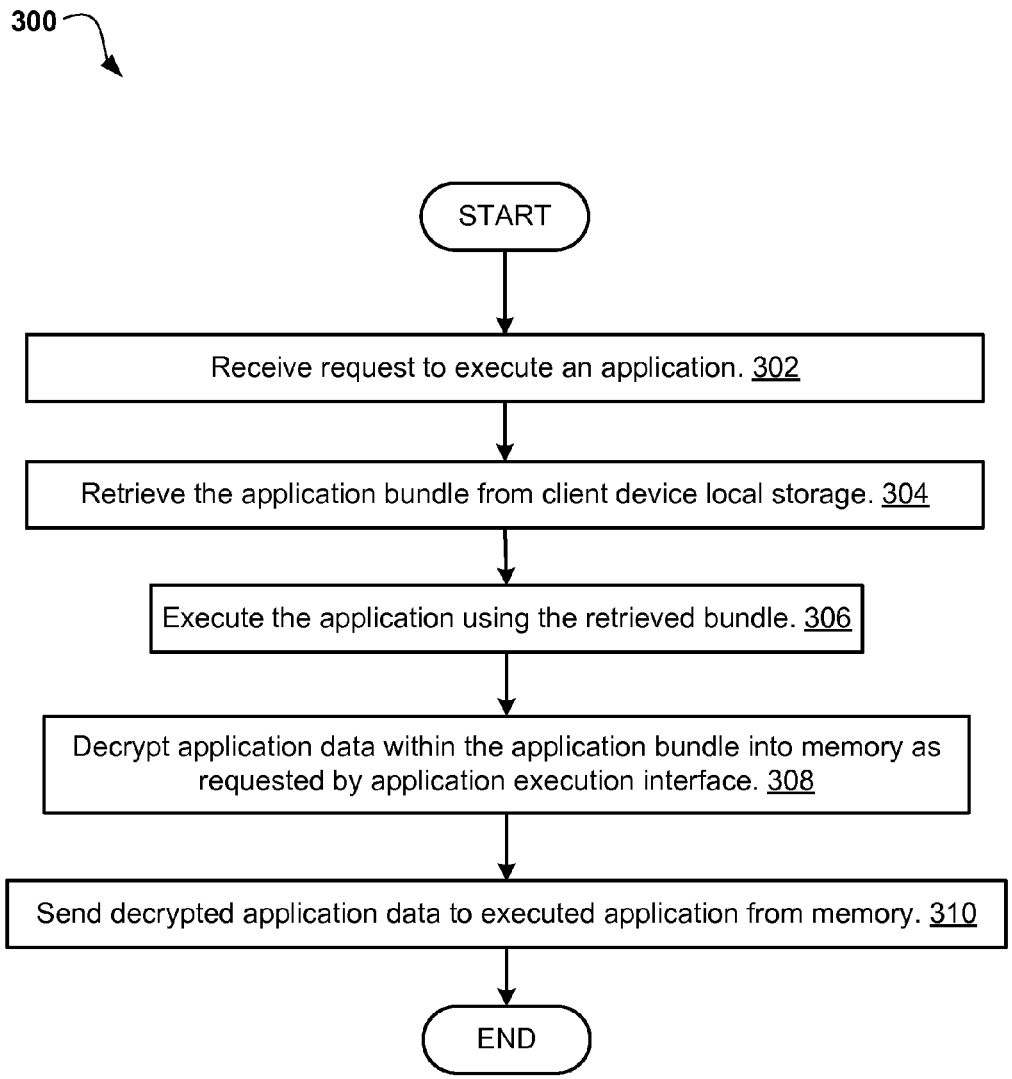
FIG. 3 illustrates a flowchart of the operational steps carried out by a program to execute a bound software application bundle, in accordance with one embodiment of the present invention.

Referring now to FIG. 3, a flowchart 300 of the operational steps carried out by a program to execute a bound software application bundle is depicted, in accordance with one embodiment of the present invention. At 302, application binding program 112A receives a request through application execution interface 118 to execute an application. When a user chooses to open an application that has been encrypted by application binding program 112B, application execution interface 118 may be notified since bound application bundle 124 may require decrypting in order to properly execute the user selected application.

Next at 304, application execution interface 118 retrieves bound application bundle 124 from local data storage within client computing device 110. Once application execution interface 118 receives a request to execute an application, application execution interface 118 may retrieve bound application bundle 124 in preparation to decrypt and execute data contained within bound application bundle 124.

Then at 306, application execution interface 118 executes retrieved bound application bundle 124. Once application execution interface 118 retrieves bound application bundle 124, application execution interface 118 may load bound application bundle 124 into a segregated section of memory that may not be accessible to the application. As application execution interface 118 needs the application data contained within bound application bundle 124, application execution interface 118 may send portions of data, such as binary files and image files, to hardware module 122 for decryption. For example, if application execution interface 118 is attempting to load an application main menu, application execution interface 118 may identify the portions of data within bound application bundle 124 needed to load the application main menu and send the portions of data to hardware module 122 for decryption.

Next at 308, hardware module 122 decrypts the application data received from application execution interface 118. When encrypted data is received, hardware module 122 may decrypt the received application data using the private key associated with the device. As previously described, a private key may be a binary-based code embedded within hardware module 122 upon initial manufacture that may be used to decrypt data encrypted by a public key. For example, if app store 114 used the public key associated with client computing device 110 to encrypt the data within bound application bundle 124, each portion of data within bound application bundle 124 received by hardware module 122 from application execution interface 118 may be decrypted using the private key associated with client computing device 110. Furthermore, hardware module 122 may store the decrypted portions of application data within the segregated section of memory not accessible to the application being executed by application execution interface 118.

Then at 310, each decrypted portion of application data is sent to the application from the segregated section of memory. Once the application data requested by application execution interface 118 is decrypted, application execution interface 118 may send the decrypted application data to the application for incorporation in the execution of the application.

Figure 4:
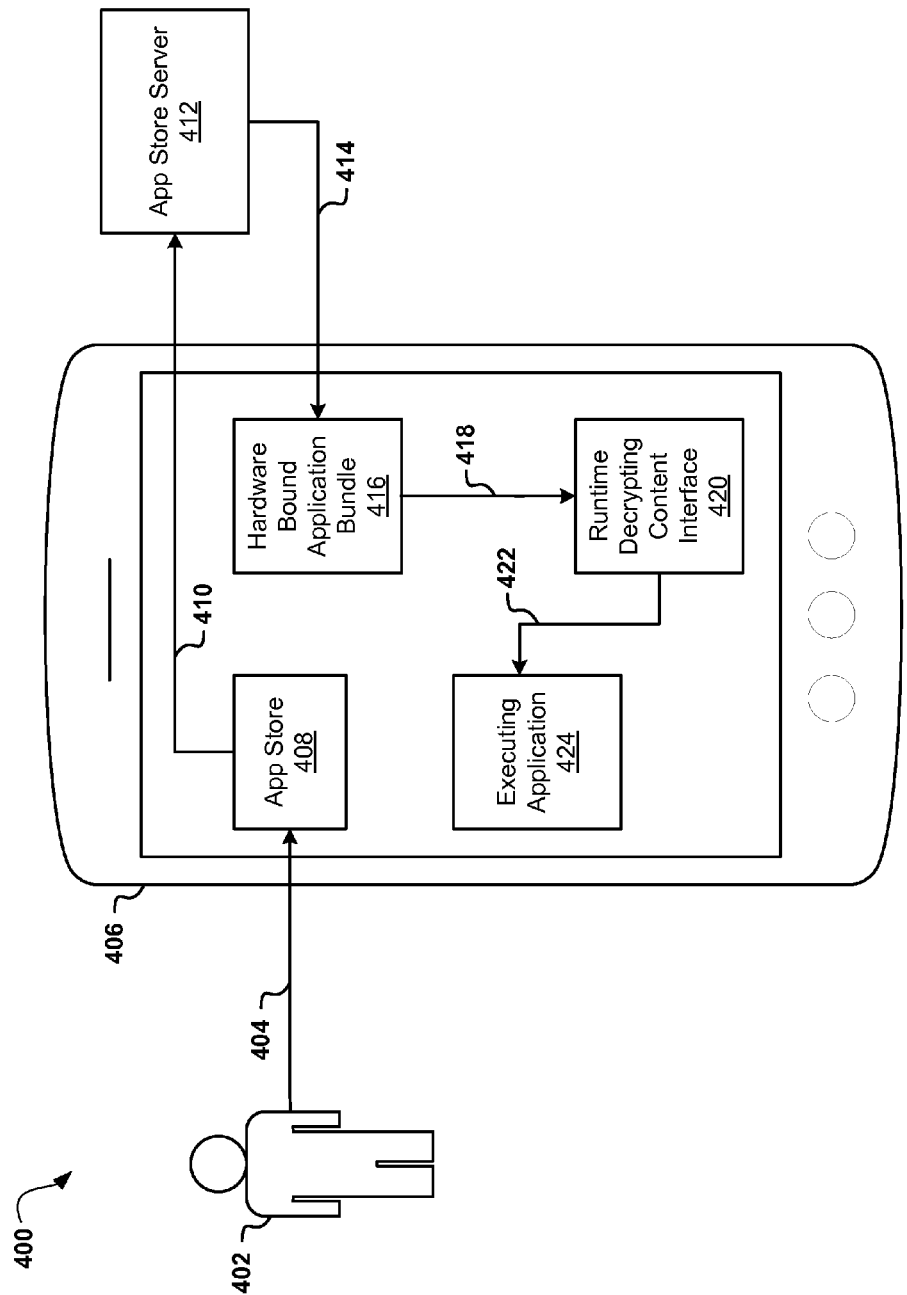
FIG. 4 is a functional block diagram of a software application binding system, in accordance with one embodiment of the present invention.

Referring now to FIG. 4, a functional block diagram 400 illustrating the steps of a software application binding system is depicted, in accordance with one embodiment of the present invention. At 404, user 402 may purchase an application, or app, on app store 408 by interacting with a graphical user interface on device 406. Then at 410, app store 408 may communicate with app store server 412 to confirm user 402 holds a valid license to download the purchased application. Next at 414, once app store 408 determines user 402 holds a valid license for the purchased application, app store server 412 may send hardware bound application bundle 416 to device 406. Hardware bound application bundle 416 may be encrypted by app store server 412 using a public key associated with device 406. Then at 418, user 402 may choose to execute the application using runtime decrypting content interface 420. Next at 422, runtime decrypting content interface 420 may send encrypted data from hardware bound application bundle 416 to hardware module 122 for decryption using a private key associated with device 406. The encrypted data may be decrypted by hardware module 122 and sent to executing application 424 in real time and as needed. Runtime decrypting content interface 420 may continue to send encrypted data to hardware module 122 for decryption until executing application 424 is terminated.

Figure 5:
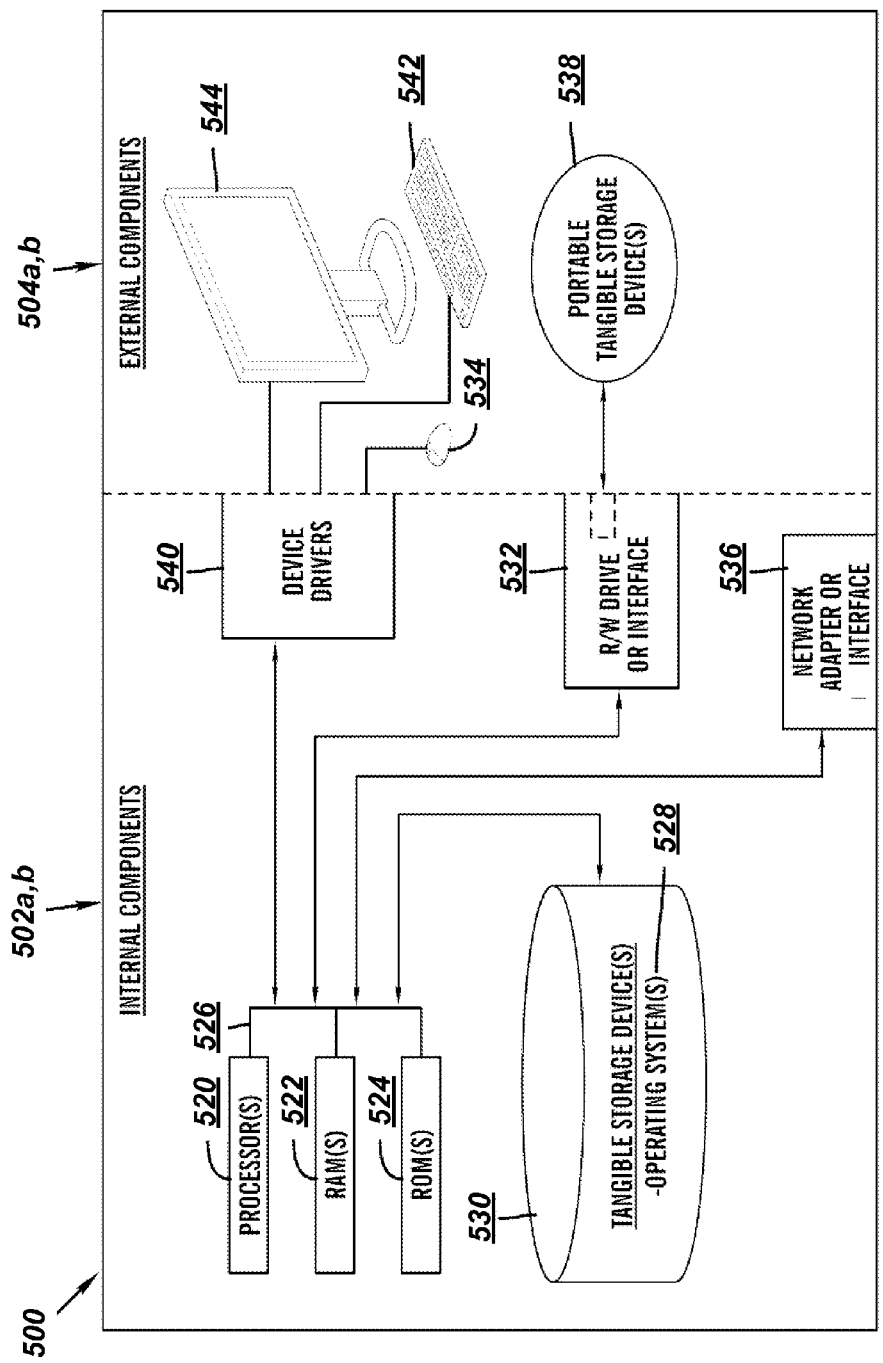
FIG. 5 depicts a cloud computing node according to an embodiment of the present invention.

FIG. 5 is a block diagram 500 of internal and external components of computer 110 and server 120 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. Data processing system 502, 504 may be representative of a smart phone, a computer system, PDA, or other electronic devices. Examples of computing systems, environments, and/or configurations that may represented by data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110 and network server 120 may include respective sets of internal components 502 a,b and external components 504 a,b illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528, application binding program 112A in client computer 110; and application binding program 112B in network server 120 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as application binding program 112A, 112B can be stored on one or more of the respective portable computer-readable tangible storage devices 538, read via the respective R/W drive or interface 532 and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. Application binding program 112A in client computer 110 and application binding program 112B in network server 120 can be downloaded to client computer 110 and network server 120 from an external computer via a network (for example, the Internet, a local area network or other, wide area network) and respective network adapters or interfaces 536. From the network adapters or interfaces 536, application binding program 112A in client computer 110 and application binding program 112B in network server 120 are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542 and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
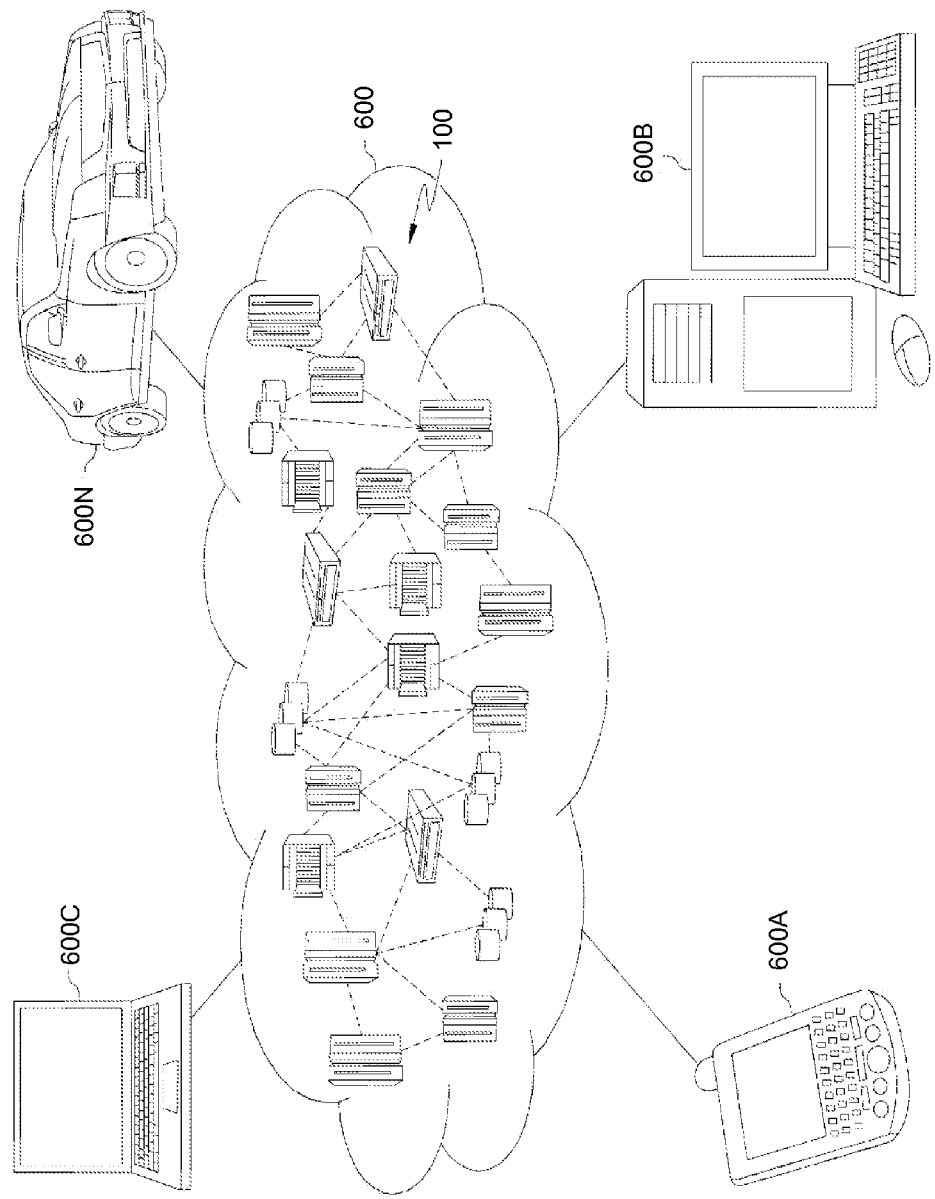
FIG. 6 depicts a cloud computing environment according to an embodiment of the present invention.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
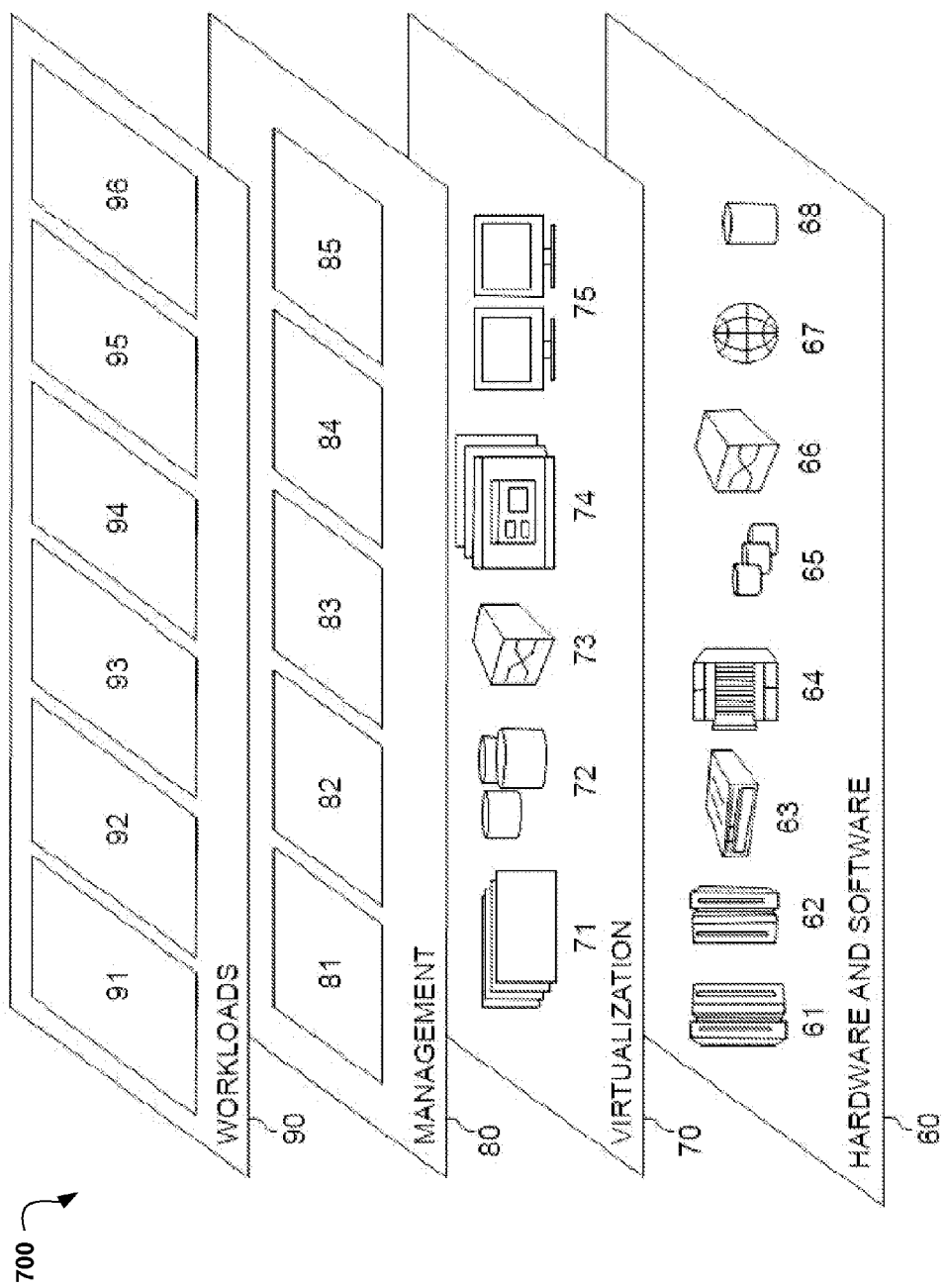
FIG. 7 depicts abstraction model layers according to an embodiment of the present invention.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and binding software application bundles 96. Binding software application bundles may encrypt data within an application bundle to a specific device using a public key associated with the device. Therefore, the encrypted application bundle data may only be decrypted by the device containing the corresponding private key.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for binding an application bundle, the method comprising:
   receiving, by a processor, a download request for an application bundle;
   retrieving the application bundle from a master data store within an application store;
   creating a device-specific binary file of the retrieved application bundle by encrypting the retrieved application bundle using a public key associated with a device;
   transmitting the created device-specific binary file to the device;
   storing the transmitted device-specific binary file in a local data storage on the device;
   in response to determining an execution request for an application has been received, decrypting a portion of the stored device-specific binary file based on the private key associated with the device, wherein the stored device-specific binary file is only decrypted for the determined execution request, and wherein the decrypted portion is stored in a segregated section of memory inaccessible to the application associated with the execution request; and
   sending the decrypted portion to an execution interface.

2. The method of claim 1, wherein the application bundle includes at least one of a plurality of application data, a plurality of imagery data, and a plurality of binary data.

3. The method of claim 1, further comprising:
   executing the decrypted portion.

4. The method of claim 1, wherein encrypting the retrieved application bundle includes encrypting the application bundle in a hardware module using the public key associated with a device.

5. The method of claim 1, wherein decrypting the transmitted application bundle includes decrypting the portion of the transmitted application bundle in a hardware module using the private key that corresponds with the device associated with the device specific encryption key.

6. The method of claim 1, further comprising:
   determining a profile associated with a user in the application store holds a valid license to receive the application bundle.

7. A computer system for binding an application bundle, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, by a processor, a download request for an application bundle;

retrieving the application bundle from a master data store within an application store;

creating a device-specific binary file of the retrieved application bundle by encrypting the retrieved application bundle using a public key associated with a device;

transmitting the created device-specific binary file to the device;

storing the transmitted device-specific binary file in a local data storage on the device;

in response to determining an execution request for an application has been received, decrypting a portion of the stored device-specific binary file based on the private key associated with the device, wherein the stored device-specific binary file is only decrypted for the determined execution request, and wherein the decrypted portion is stored in a segregated section of memory inaccessible to the application associated with the execution request; and sending the decrypted portion to an execution interface.

8. The computer system of claim 7, wherein the application bundle includes at least one of a plurality of application data, a plurality of imagery data, and a plurality of binary data.

9. The computer system of claim 7, further comprising: executing the decrypted portion.

10. The computer system of claim 7, wherein encrypting the retrieved application bundle includes encrypting the application bundle in a hardware module using the public key associated with a device.

11. The computer system of claim 7, wherein decrypting the transmitted application bundle includes decrypting the portion of the transmitted application bundle in a hardware module using the private key that corresponds with the device associated with the device specific encryption key.

12. The computer system of claim 7, further comprising: determining a profile associated with a user in the application store holds a valid license to receive the application bundle.

13. A computer program product for binding an application bundle, the computer program product comprising:

one or more non-transitory computer-readable tangible storage media and program instructions stored on at least one of the one or more non-transitory tangible storage media, the program instructions executable by a processor, the program instructions comprising:

program instructions to receive a download request for an application bundle;

program instructions to retrieve the application bundle from a master data store within an application store;

program instructions to create a device-specific binary file of the retrieved application bundle by encrypting the retrieved application bundle using a public key associated with a device;

program instructions to transmit the created device-specific binary file to the device;

program instruction to store the transmitted device-specific binary file in a local data storage on the device;

in response to determining an execution request for an application has been received program instructions to decrypt a portion of the stored device-specific binary file based on the private key associated with the device, wherein the stored device-specific binary file is only decrypted for the determined execution request, and wherein the decrypted portion is stored in a segregated section of memory inaccessible to the application associated with the execution request; and program instructions to send the decrypted portion to an execution interface.

14. The computer program product of claim 13, wherein the application bundle includes at least one of a plurality of application data, a plurality of imagery data, and a plurality of binary data.

15. The computer program product of claim 13, further comprising:

program instructions to execute the decrypted portion.

16. The computer program product of claim 13, wherein encrypting the retrieved application bundle includes encrypting the application bundle in a hardware module using the public key associated with a device.

17. The computer program product of claim 13, wherein decrypting the transmitted application bundle includes decrypting the portion of the transmitted application bundle in a hardware module using the private key that corresponds with the device associated with the device specific encryption key.

* * * * *